Nov. 16, 1943.  N. GARRETT  2,334,404
APPARATUS FOR SOLVING PROBLEMS
Original Filed May 27, 1936  4 Sheets-Sheet 1
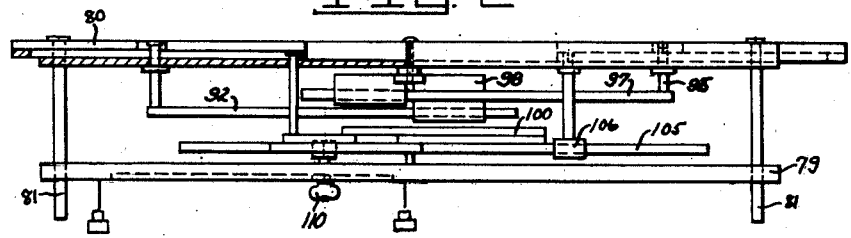
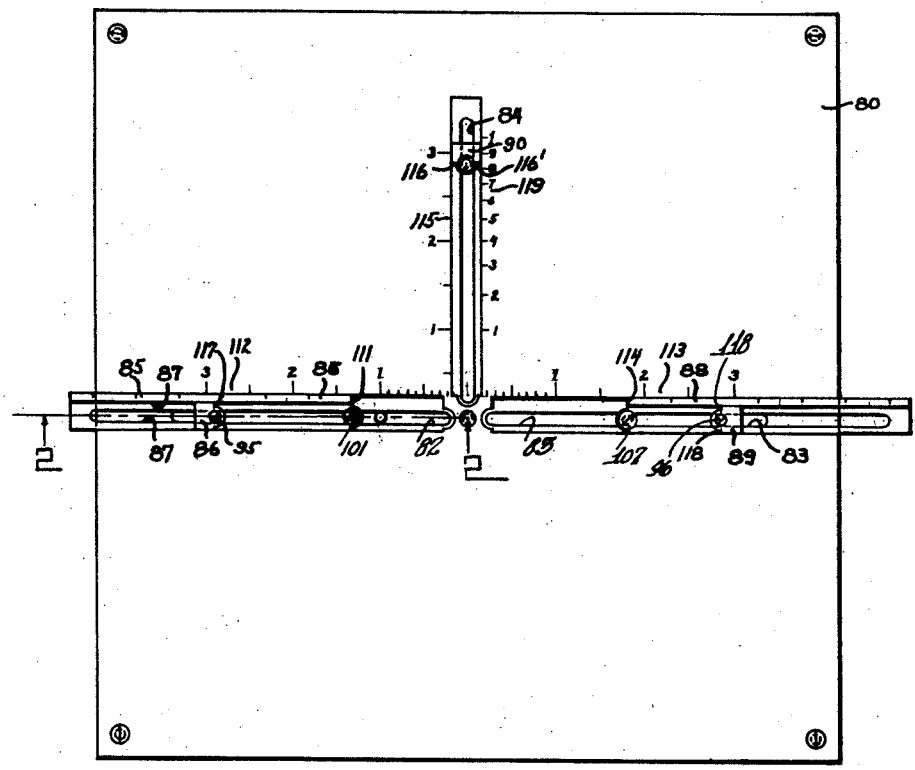
INVENTOR.
Neal Garrett

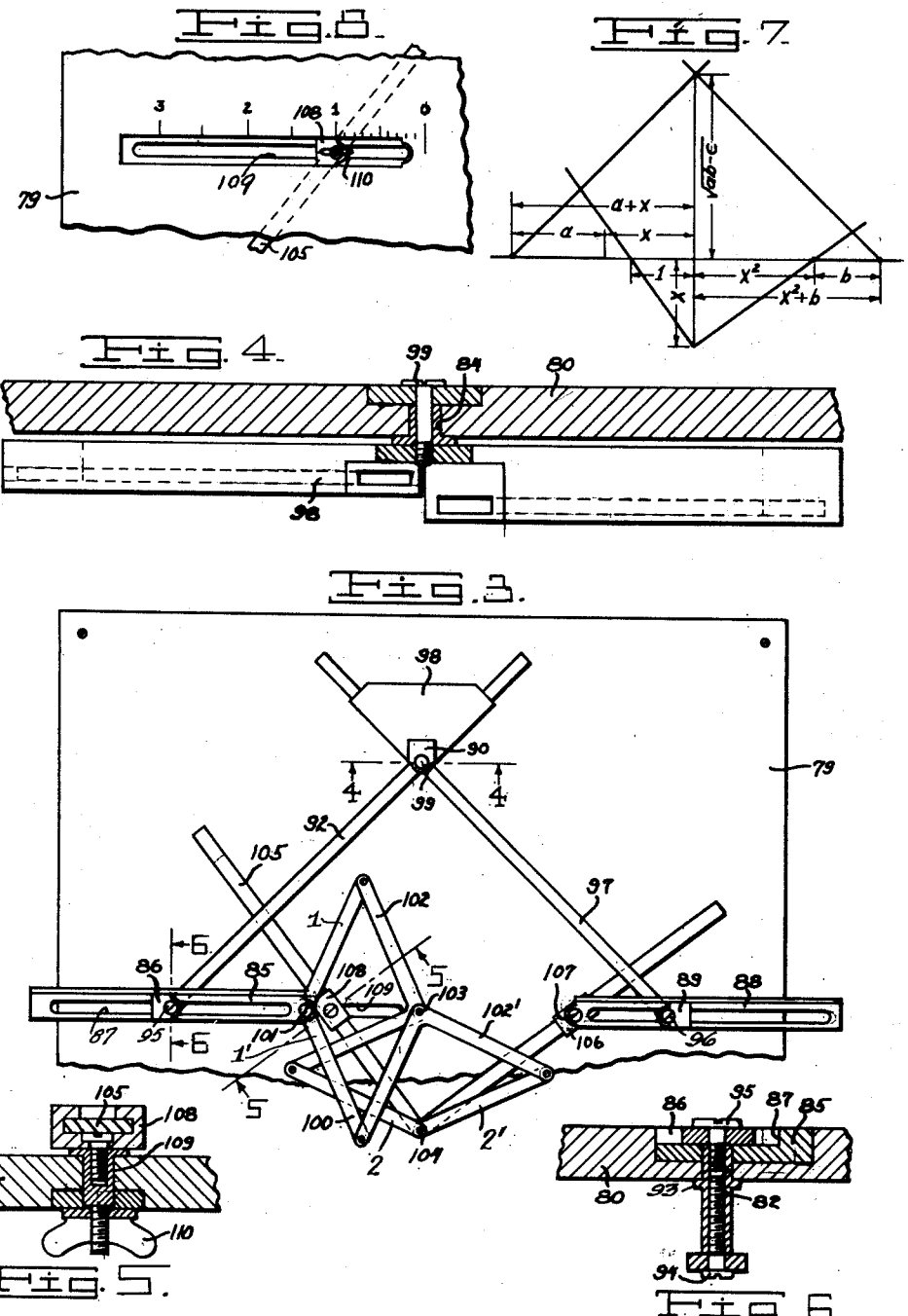

Nov. 16, 1943.   N. GARRETT   2,334,404
APPARATUS FOR SOLVING PROBLEMS
Original Filed May 27, 1936   4 Sheets-Sheet 3

INVENTOR.
Neal Garrett

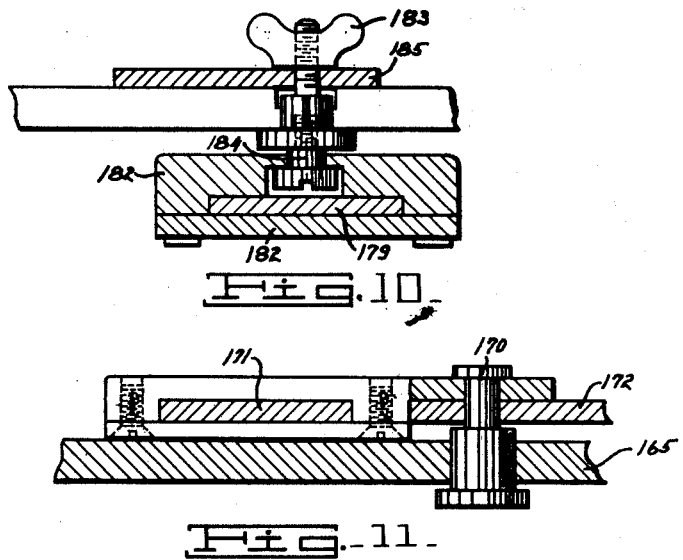
Fig. 10.
Fig. 11.
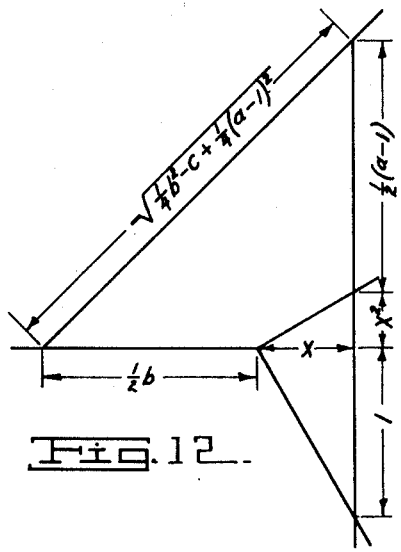
Fig. 12.
INVENTOR.
Neal Garrett

Patented Nov. 16, 1943

2,334,404

UNITED STATES PATENT OFFICE 2,334,404

APPARATUS FOR SOLVING PROBLEMS

Neal Garrett, Glendale, Calif.

Original application May 27, 1936, Serial No. 81,990. Divided and this application May 15, 1940, Serial No. 335,422

22 Claims. (Cl. 33—1)

This application shows some subject matter of invention that comes within the scope of some of the claims that have been allowed in applicant's applications Serial Numbers 81,990 and 297,322, filed May 27, 1936, and September 30, 1939, respectively. This application is a division of application Number 81,990.

This invention relates to apparatus for use in solving mathematical problems. This invention more especially relates to apparatus for use in solving algebraic equations that includes a plurality of devices each having a movable index element, and means adapted to transmit motion between the index elements of the several devices and to constrain the same so that the position of an index element on one of the devices will bear a given algebraic relationship to the positioning of the index elements on the other devices.

An object of my invention is to provide apparatus including suitable devices having movable index elements which can be conveniently set at positions representing quantities readily determinable from numerical terms of an equation, and to provide such apparatus adapted to automatically indicate the value of the unknown on a suitable indicating device.

Another object of this invention is to provide an apparatus having parts relatively movable to represent any pair of spacings of a series of pairs of spacings wherein one of the spacings of each pair is automatically maintained equal to the square of the other.

A still further object of this invention is to provide apparatus wherein a rigid square is utilized as a working part.

A still further object of this invention is to provide a simple means for maintaining three joints of an adjustable and jointed structure relatively disposed so as to define a right angle for all positions of adjustment of the structure.

A still further object of this invention is to provide an apparatus for use in solving algebraic equations of the form $$x^3 + ax^2 + bx + c = 0$$

A still further object of this invention is to provide apparatus for use in solving fourth degree equations.

A still further object of this invention is to provide articles of manufacture in the form of parts, and combinations of parts, adapted to be put together and torn down as needed in providing adjustable devices for use in solving mathematical problems. It is a purpose of the invention to provide a relatively simple set of inexpensive members adapted to be assembled for a relatively constrained movement thereof for illustrating to a student many fundamental relations, proportions, and relative movements that give rise to many fundamental algebraic relationships. It is intended that such articles of manufacture together with methods of using the same will make possible the assembly of parts for providing a device that can be operated for the solution of an almost unlimited number of certain specific algebraic problems.

In the drawings:

Fig. 1 is a top plan view of an apparatus especially adapted for solving third degree equations;

Fig. 2 is a part sectional view and part elevational view of the apparatus shown in Fig. 1, the left-hand portion thereof being a sectional view on line 2—2 of Fig. 1;

Fig. 3 is a fragmentary top plan view similar to Fig. 1 showing the apparatus with the upper plate removed;

Fig. 4 is a fragmentary sectional view taken on line 4—4 of Fig. 3;

Fig. 5 is a fragmentary sectional view taken on line 5—5 of Fig. 3 showing a fragment of the lower plate and a clamping device for holding an arm pivotally and slidably at any desired position along a race in the lower plate;

Fig. 6 is a fragmentary sectional view on line 6—6 of Fig. 3;

Fig. 7 is a diagram illustrating the theory of operation of the apparatus shown in Figures 1 to 6, inclusive;

Fig. 8 is a fragmentary bottom view taken as indicated at 8—8 on Fig. 2;

Fig. 10 is a fragmentary sectional view taken on line 10—10 of Fig. 9;

Fig. 11 is a fragmentary sectional view taken on line 11—11 of Fig. 9; and

Fig. 12 is a diagram illustrating the theory on which the apparatus shown in Fig. 9 is based.

Figure 9:
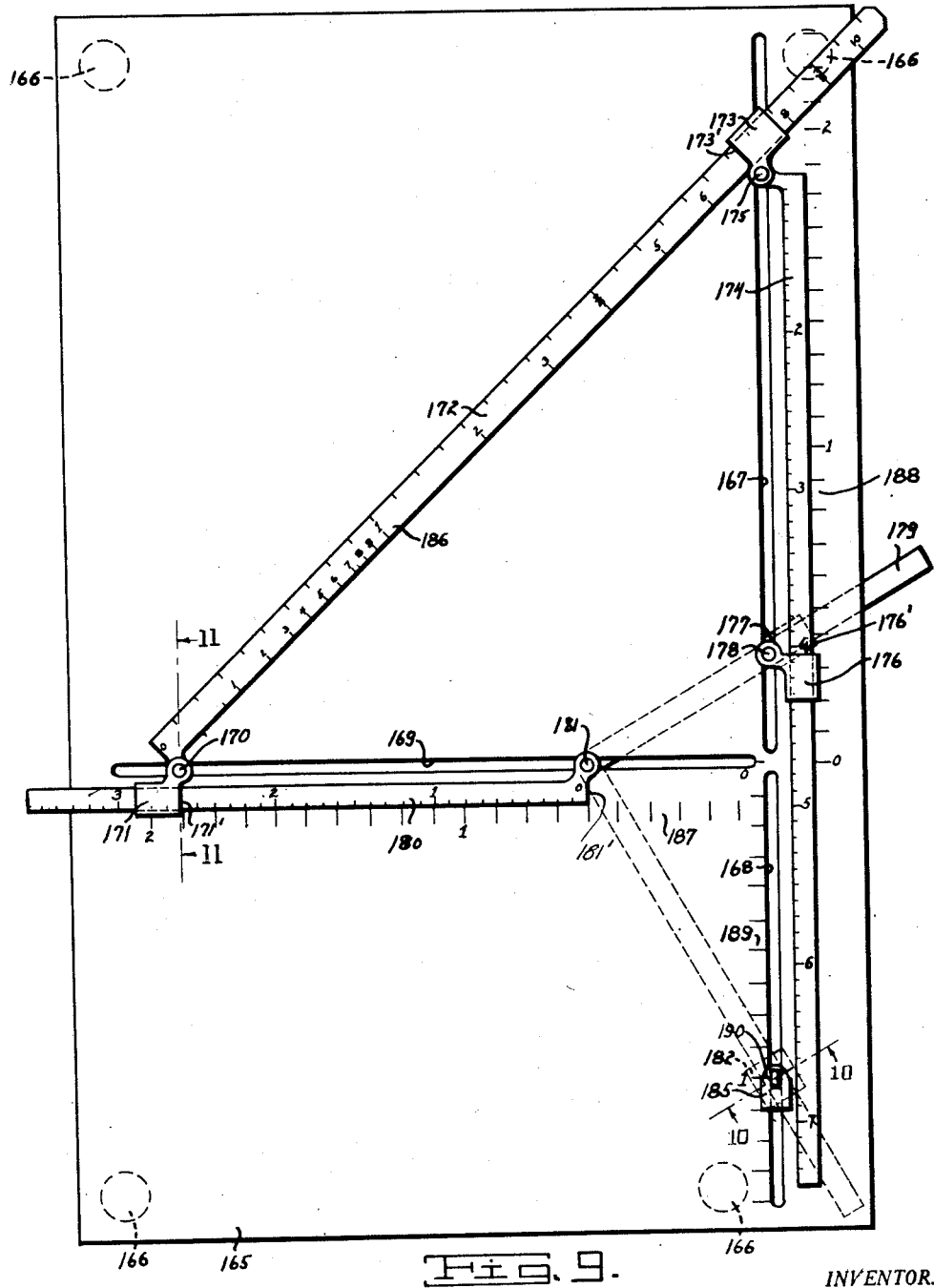
Fig. 9 is a top plan of an apparatus embodying a modification of my invention.

Referring to the drawings and specifically to Figures 1 to 8, inclusive, a framework is provided by lower plate 79, upper plate 80 and legs 81, a portion of which legs serve to hold the plates in a relatively rigid spaced relationship. Upper plate 80 is provided with rectilinear races 82 and 83 which are in the form of rectilinear slots positioned in alinement with each other. Rectilinear race or slot 84 is provided in plate 80 disposed at right angles with respect to races 82 and 83. Scale member 85 is slidably fitted into plate 80 as is best shown in Fig. 6. Index member 86 is slidably fitted in a groove 87. The bottom and one side of this groove is provided by the specially shaped portion of scale 85 as shown in Fig. 6, the other side being provided by a vertical edge of a cut away portion of plate 80. The construction and assembly of sliding scale 88 and sliding index member 89 with respect to race 83 is similar to the construction and assembly of scale 85, index member 86, and race 82.

Index member 90 is mounted in a race similar to race 82 except that the race is shallower, narrower, and symmetrical because it need only provide for the sliding of the single index member.

Scale 85 is provided with a race 87 having its center line disposed in rectilinear alinement with respect to the center line of race 82. The index member 86 is pivotally connected through the race in scale 85 and through the race 82 to arm 92, as by bearing 93 and screws 94 and 95, as shown in Fig. 6. A similar pivotal connection 96 is provided between index member 89 and arm 97.

The arms 92 and 97 are slidably held and rigidly constrained to movement at 90 degrees relatively by right-angular brace 98, a fragmentary sectional view of which is shown in Fig. 4 with the arms removed. Brace 98 is pivotally connected through race 84 to sliding index member 90 as by screw 99.

The end of scale 85 is pivotally connected by pin 101 through race 82 to a pivotal extremity of the adjustable structure 100 comprised of members 1, 1', 102, 102', 2, and 2', and the pivotal connections between the members. Members 102 and 102' are in the form of rigid squares which adapt the adjustable structure 100 to maintain pin 101 and pivot 104 equidistant from central pivot 103 and to constrain the movement of pivot 104 to rectilinear motion at right angles with respect to race 82. Central pivot 103 is fixed with respect to plate 80 at a position in alinement with the center lines of races 82 and 84.

Pivot 104 provides pivotal connection between members 2 and 2' and rigid square 105. One arm of rigid square 105 is slidably engaged with respect to a glide 106, which glide is pivotally connected to the end of scale 88 as by pin 107. The other arm of rigid square 105 is slidably engaged in glide 108. Fig. 5 illustrates the construction of glide 108 and the connection thereof with the lower plate through race 109. Means for fixing the glide 108 at any desired distance from central pivot 103 along race 109 is provided by the thumb-screw and other elements of the clamping assembly 110 illustrated in Fig. 5. Glide 108 is always pivotally connected to the clamping assembly 110.

Scale 112, on plate 80, is graduated as a linear scale and has suitable indicia so that the indicating edge 111 of the end of scale 85 will register with a graduation representing the distance of the axis of pin 101 from the axis of the center pivot 103. The arrangement of scale 113 and indicating edge 114 is symmetrical with respect to that of scale 112 and indicating edge 111. Scale 115 is similarly provided for use together with indicating element 90 for indicating the distance of the axis of screw 99 from the axis of central pivot 103. Scale 85 is provided with graduations adapted for use together with the indicating edge 117 for indicating the distance between the axis of pivotal connection 95 and pin 101. Scale 88 is provided with suitable graduations for use together with indicating edge 118 in determining the distance between the center point of pin 107 and pivotal connection 96.

To solve a cubic equation of the general form $$a_0x^3 + a_1x^2 + a_2x + a_3 = 0$$

by means of the apparatus just described, divide the equation by $a_0$ to place it in the form $$x^3 + ax^2 + bx + c = 0$$

fix the axis of glide 108 at a distance of unity from the axis of the central pivot 103 by using clamping assembly 110. Space the axis of screw 95 and pin 101 a distance representing a value of $a$ by placing indicating edge 117 of index member 85 at a graduation representing the value of $a$ on scale 85. Space the axis of pin 107 and pivotal connection 96 a distance representing the value of $b$ by placing index edge 118 at a position on scale 88 representing a value of $b$. Space the axis of indicating edge 116 from the axis of central pivot 103 a distance equal to the square root of $ab-c$ by placing index edge 116 at a graduation representing the numerical value of the square root of $ab-c$ after determining the same, or preferably, set indicating edge 116' at a position representing $ab-c$ on scale 119. The actual distances from the axis of the central pivot in a direction parallel to scale 119 are the square root of the values as indicated by indicia of scale 119. The apparatus will automatically adjust itself so as to provide spacings of respective parts thereof relatively disposed to represent the respective terms of the equation as is shown in Fig. 7.

Since the adjustable structure 100 maintains the axis of pin 101 and pivot 104 equidistant from central pivot 103, the distances labeled $x$ will always be equal. If the hypotenuse of any right triangle be divided into two segments by a perpendicular thereto through the apex of the right angle, the product of the two segments is equal to the square of the distance between the hypotenuse and the apex of the right angle. The distances labeled $l$ and $x^2$ are such segments of the hypotenuse of a right triangle and their product is equal to the square of the dimension labeled $x$ of the same triangle. Therefore, the distance labeled $x^2$ will always be the square of the distance labeled $x$. For the same reason, the distance labeled $a+x$ multiplied by the distance labeled $x^2+b$ must be equal to the square of the distance labeled $\sqrt{ab-c}$.

The last mentioned form of the third degree equation is arranged in the form of a product of two factors placed equal to a constant term by adding $ab-c$ to both sides of the equation and factoring the remaining portion of the left-hand member. When this is done, the equation is placed in the form $$(x+a)(x^2+b) = ab-c$$

which is the relationship between the segments of the hypotenuse and the perpendicular thereto of the largest right triangle shown in Fig. 7.

By known methods any third degree equation can be conveniently placed in a form so that one real root thereof can be obtained by use of the apparatus having a range of that just described. The pivotal connections are adapted to facilitate removal thereof and use thereof in providing pivotal connection between other parts of the apparatus so that other arrangements of the parts may be made for the solution of special problems. Arm 97 is sometimes pivotally connected to scale 88 where pin 107 is shown and glide 106 is pivotally connected to index member 89 where pin 96 is shown. A similar interchange of the connection between adjustable structure 100 and scale member 85 and between arm 92 and index member 86 is sometimes made.

The adjustable structure 100 illustrates one form of apparatus for relatively constraining three parts so as to represent a right angle. The parts constrained are pivot 101, central pivot 103, and pivot 104 which may be termed joints of the adjustable structure. The adjustable structure is comprised of six members jointed in such a way as to form two four-sided adjustable figures having joint 103 in common and having members 102 and 102′ intersecting at joint 103 and forming one of two adjacent sides of both of the figures, respectively. All of the sides of the four-sided figures of adjustable structure 100 need not be equal if such structure is merely to perform the function of maintaining the aforementioned three joints relatively disposed to represent a right angle, however, such a structure is adapted to perform this function if the sum of the angle between the sides formed by member 102 and the angle between the sides formed by member 102′ is equal to 180° and one of the figures has the aforementioned adjacent sides thereof equal and the other sides thereof equal and the other figure has the aforementioned adjacent sides thereof equal and the other sides thereof equal. Such a structure is also adapted for maintaining joints 101 and 104 equidistant from joint 103, if each of the last mentioned angles are right angles and the sides formed by members 1, 1′, 2, and 2′ are equal.

The apparatus illustrated by Figures 9, 10, 11, and 12 is adapted for use in solving fourth degree equations. Plate 165 is supported by legs which are attached to the underside of plate 165 at relative positions as indicated by dotted circles 166 in Fig. 9. These legs are preferably of equal lengths and long enough to hold the rest of the apparatus so that it will clear a flat surface when the apparatus is set on such a surface. Races 167 and 168 are provided in plate 165. These races are disposed in rectilinear alinement. Race 169 is provided in plate 165 and is disposed at 90 degrees with respect to races 167 and 168. Pin 170 is slidably engaged in race 169 and provides pivotal connection between sliding index member 171 and arm 172. Arm 172 is slidably engaged in index member 173. Index member 173 is pivotally connected to scale member 174 as by pin 175. Pin 175 is slidable in race 167. Member 174 is slidably engaged in index member 176. Index member 176 is pivotally connected through race 167 to glide 177 as by pin 178. Rigid square 179 is slidably engaged with glide 177 and pivotally connected to scale member 180 as by pin 181. Scale member 180 is slidably engaged with index member 171. Square 179 is slidably engaged in glide 182. Glide 182 is pivotally connected to clamping assembly 183 by screw 184 as is best shown in Fig. 10. Clamping assembly 183 includes an index plate 185.

To solve an equation of the fourth degree of the general form $$a_0x^4 + a_1x^3 + a_2x^2 + a_3x + a_4 = 0$$

divide by $a_0$ and substitute for $x$ the expression, $$\left(x_1 \frac{p}{4}\right)$$

where $p$ is the value of the coefficient of the third power of the unknown letter. The resulting equation may be considered to be in the form $$x^4 + ax^2 + bx + c = 0$$

Set index edge 176′ of index member 176 at a position with respect to the graduations on scale member 174 corresponding to the value of $a$. Set the index edge 171′ of index member 171 at a position with respect to the graduations on scale member 180 so as to represent the value of $b$. Compute the value of $$\frac{1}{4}b^2 - c + \frac{1}{4}(a-1)^2$$

and while holding the index member 171 and 176 stationary with respect to the scales on which they have been set, regulate the position of the arm 172 with respect to index member 173 so that the position of the index edge 173′ with respect to the graduations on square root scale 186 will indicate the value of the expression just computed. The position of index edge 181′ of member 180 with respect to the graduations of scale 187 will indicate a value of one root of the equation of the form last mentioned and the position of the index edge 176′ of member 176 along scale 188 will indicate a value of the square of the same root, it being assumed that the index plate 185 has been held by clamping assembly 183 at a position along scale 189 so as to hold the pivotal connection of glide 182 at a distance of unity from the point of intersection of the races 167 and 168 and 169. From the root obtained as just mentioned $$\frac{p}{4}$$

is subtracted to obtain one root of the original third degree equation.

The theory on which the operation of the apparatus in Fig. 9 is based will now be described. Starting with the equation in the form after the second term has been removed, take one $x^2$ away from the second term to leave $(a-1)x^2$ to be combined with the fourth power in providing a perfect square and combine said one $x^2$ with the rest of the equation in forming another perfect square. The perfect squares are formed by adding the necessary constants to both sides of the equation. The algebra for thus converting the equation to the form of the sum of two squares placed equal to a constant is as follows: Starting with the equation in the form, $$x^4 + ax^2 + bx + c = 0$$

taking one $x^2$ away from the second term, $$x^4 + (a-1)x^2 + x^2 + bx + c = 0$$

adding $$\frac{1}{4}b^2 - c$$

to both sides of the equation, $$x^4 + (a-1)x^2 + x^2 + bx + \frac{1}{4} \quad \frac{1}{4}b^2 - c$$

adding $$\frac{1}{4}(a-1)^2$$

to both sides of the equation, $$x^4 + (a-1)x^2 + \frac{1}{4}(a-1)^2 + \left(x + \frac{1}{2}b\right)^2 = \frac{1}{4}b^2 - c + \frac{1}{4}(a-1)^2$$

the equation becomes, $$\left(x^2 + \frac{a-1}{2}\right)^2 + \left(x + \frac{1}{2}b\right)^2 = \frac{1}{4}b^2 - c + \frac{1}{4}(a-1)^2$$

This places the equation in a form where the square roots of the two terms of the left-hand member may be expressed by the sides of the larger triangle shown in Fig. 12, and the square root of the right-hand member as the hypotenuse of the triangle. The rest of the theory of the operation of this device is illustrated by Fig. 12. Scale member 180 is provided with graduations half the size of those of most of the scales so that a setting of b can be made directly. The scale on member 174 has the same spacing of graduations as that of member 180, however, the indicia start with unity instead of zero so that a setting of the "a" term may be made directly. Arm 172 is provided with both square root and linear scales so that either the square root of the right-hand member of the equation or the direct value thereof can be set on arm 172. The scale to which all of the settings are made can be changed to any desired scale within the limits of the range of scales, a unit of which can be set within the range of scale 189. The spacing of index mark 190 along scale 189 determines the scale to which the rest of the settings and readings are to be made and taken, respectively.

By known methods many fourth degree equations can be placed in a form so that one real root thereof can be obtained by use of apparatus having a range of that shown in Fig. 9.

A simple apparatus for use in obtaining the square and square roots of quantities is provided by just a portion of the apparatus of Fig. 9 comprised of the square 179, pins 178 and 181, glide 177, the part of the plate 169 that maintains races 167 and 169, and the means that maintains one arm of the square pivotally and slidably at a distance of unity from race 169 and in alinement with race 167. Such apparatus may be considered as including two scale means, each having one of the races as a rectilinear element thereof and a respective one of the pins as a movable element thereof. The movable elements 178 and 181 are movable with respect to a common reference point that is so situated that it is in alinement with both of the races. The square 179, glide 177, and the means that maintains one arm of the square pivotally and slidably at a distance of unity from race 169 in alinement with race 167 constitutes means for maintaining the displacement of member 181 with respect to the common reference point equal to the square of the displacement of member 178 from the common reference point for all positions of adjustment of the simple apparatus just described.

Wherever necessary to make the meaning of any part of this specification or of the appended claims definite, the words "figure" or "figures" are to be considered as referring to a tangible object or objects having shape and form such as the structure, frame, or assembly of tangible elements that represent an adjustable right triangular structure. For the purpose of defining the language of the claims of this application wherein mention is made of any adjustable right triangular figure or figures, it is to be understood that any such figure is to be considered as including two perpendicularly related sides and having both of the sides adjustable as to length and being otherwise adapted to be used to represent any of a series of right triangles, within predetermined limits. A side of such a figure includes elements that are movable with respect to each other so that their relative positions may be changed from that for representing the length of a side of one triangle to that for representing the length of a side of another triangle. The two adjustable right triangular figures of Figures 1 and 3 made up essentially of races 82, 83, and 84, arms 92 and 97, and the connections thereof with the races may be considered as including means for maintaining the figures similar because one of their sides is constantly along the center line of race 84 and right angle connector 98 maintains arm 92 at right angles to arm 97. The disclosure of this application and some of that of application Serial Number 81,990, of which this application is a division, shows that two adjustable right triangular figures including means for maintaining the figures similar and having a side of one of the figures constantly equal to a side of the other of the figures can be made so that one of the sides of both of the figures are along the same straight line or can be made so that the figures are separated by providing means for transmitting a dimension of one of the triangular figures to the other of the triangular figures so as to maintain a side of each of the figures equal and by providing means for maintaining the figures similar. It is to be understood that both of the last mentioned means are to be considered as part of the structure referred to as two adjustable right triangular figures, whether or not the elements, or some thereof, that constitute the means are essential elements of any of the sides or other portions of the figures.

With reference to a side of one of two similar right triangular figures, the side opposite the corresponding side of the other of the figures is hereby defined as the side of the said other of the figures that makes a different angle with the hypotenuse of the said other of the figures than does the first mentioned side make with the hypotenuse of the first mentioned figure. A right triangular figure is considered to have two sides and these sides are considered to be those that are disposed at right angles with respect to each other. A side of a right triangular figure is considered to be opposite the other side of the right triangular figure.

Wherever reference is made to apparatus for use in solving algebraic equations of a certain form, such reference is not to be restricted in its application to apparatus for use in solving all equations of that certain form, but is to apply to apparatus for use in solving some algebraic equations of that certain form.

The foregoing is to be considered as illustrative of, rather than limitative upon, the scope of the meaning of the terms used in the appended claims.

While preferred forms of the invention have been described, it is to be understood that the drawings and the description thereof are to be considered as illustrative of, rather than limitative upon, the broader claims, because it will be apparent to those skilled in the art that changes in apparatus may be made without departing from the scope of the invention.

I claim:

1. In apparatus for use in solving mathematical problems, two fixed scales at right angles to each other; two sliding scales, each of said sliding scales being constantly parallel to a respective one of the fixed scales and having the motion thereof constrained to translation in the direction of the length thereof; an arm adapted to represent the hypotenuse of an adjustable right triangular figure having sides thereof substantially along the fixed scales; an index member connected with said arm substantially at one extremity of the hypotenuse of said adjustable right triangular figure, said index member being slidably engaged with one of the sliding scales and mounted for movement longitudinally of the one of the fixed scales with which said one of the sliding scales is parallel; and a second index member connected with the other one of said sliding scales substantially at the other extremity of the hypotenuse of said adjustable right triangular figure, said second index member being slidably engaged with said arm and mounted for movement longitudinally of the other one of the fixed scales.

2. In apparatus for use in solving mathematical problems, a base having two perpendicularly disposed races and graduated scales parallel to the respective races; two graduated sliding scales, each of said sliding scales being disposed longitudinally of and slidable linearly of a respective one of the races; a graduated rectilinear arm adapted to represent the hypotenuse of an adjustable right triangular figure having sides thereof substantially in alinement with the races; an index member having pivotal connection with said arm substantially at one extremity of the hypotenuse of said adjustable right triangular figure, said index member being slidably engaged with one of the sliding scales, the connection of said index member with said arm being engaged with, and for movement longitudinally of, the one of the races with which said one of the sliding scales is slidable linearly; and a second index member slidably engaged with respect to said arm and having pivotal connection with the other one of the sliding scales, the last mentioned connection being engaged with, and for movement longitudinally of, the other one of the races.

3. In apparatus for use in solving mathematical problems, a base having a pair of relatively fixed perpendicularly related scales fixed with respect to the base, index members slidable on the respective scales whose respective positions on the scales each represent a value of a power of a term of an algebraic problem, a rectilinear arm extending between the index members having pivotal connection with one thereof and having slidable and pivotal connection with the other thereof, and means for transmitting motion between said arm and the base and for constraining the movement of said arm with respect to the scales for determining the position of the index elements for any values of other terms of the problem within predetermined limits, said means having connection with the base and said arm, the connection of said means with said arm being separate from the aforementioned slidable and pivotal connection and the one of the index members having the slidable and pivotal connection with one of the scales, so that, upon a movement of the other index member, relative motion is transmitted from said other index member and the base to said arm through means independent of the aforementioned slidable and pivotal connection and the one of the index members having the slidable and pivotal connection with one of the scales, and simultaneously motion is transmitted from the arm through the last mentioned connection to the last mentioned index member.

4. In apparatus for use in solving algebraic equations, a rectilinear guideway; a square; a scale for movement along the guideway; a pivotal connection between one end of the scale and the square, said connection being substantially at the juncture of the arms of the square and said connection being slidably engaged with said guideway; a race disposed at right angles with respect to the guideway; a second scale disposed at right angles to the first named scale; an index member slidably engaged with said second scale; a glide slidably engaged with one arm of the square; a pivotal connection between said index member and said glide; a glide slidably engaged with the other arm of said square; means for pivotally supporting the last mentioned glide at selective positions in alinement with said races; an oblique scale extending obliquely with respect to the other two scales; an index device slidably engaged with the first named scale; a pivotal connection between said index device and one end of the oblique scale, the latter connection being slidably engaged with the guideway; an index element slidably engaged with the oblique scale; and a pivotal connection between said index element and one end of said second scale, the latter pivotal connection being slidably engaged with said race.

5. In apparatus for use in solving algebraic equations of the form $$x^3+ax^2+bx+c=0$$

a base having a rectilinear guideway and a first race at right angles to the guideway extending to one side of the guideway and a second race at right angles to the guideway and extending to the other side of the guideway in alinement with the first race, said base having a scale for representing dimensions from the races in a direction perpendicular to the races that represent values of the square root of $ab-c$; a sliding index member adapted for movement along the guideway whose position along the aforementioned scale represents the square root of $ab-c$; two rectilinear arms; slidable and pivotal connection between the arms and the sliding index member, said connection being adapted to maintain the arms at right angles to each other; scales along the races being graduated from a position in perpendicular alinement with the axis of the aforementioned pivotal connection; two rectilinear scale members mounted for movement in the respective races each being provided with a guideway in alinement with the races; sliding index members adapted to move along the respective guideways of the respective scale members; pivotal connections between the respective arms and the respective index members; a square having perpendicularly related arms; a slidable and pivotal connection between one of said arms of the square and the base at a point along one of the races at a distance of unity from the line of movement of the aforementioned axis; a pivotal and slidable connection between the other arm of the square and the one of the scale members that is mounted for movement in the other race; and means for maintaining the vertex of the square in alinement with the line of motion of the aforementioned axis and for maintaining said vertex and an extremity of the one of the scale members other than the one last mentioned at an equal distance from the intersection of said line of motion and a line through the axis of the last mentioned connections.

6. In apparatus for use in solving mathematical problems, two scale means, each including a rectilinear fixed element and an index member mounted for translation longitudinally with respect to the fixed element, each of said scale means being adapted for having the position of the index member along the fixed element represent a spacing to a linear scale, the fixed element of one of the scale means being fixed with respect to the fixed element of the other of the scale means; and means for transmitting motion from the index member of one of the scale means to the index member of the other of the scale means and for constraining the motion of the index members with respect to each other and with respect to the fixed elements of the scale means so that, for any position of the index members along the respective fixed elements of the scale means, within predetermined limits, the position of the index member along the fixed element of one of the scale means represents a spacing that is equal to the square of the spacing represented by the position of the index member along the fixed element of the other scale means, said means being comprised of relatively movable, resistant parts and having one of said parts pivotally engaged with one of the index members, another of said parts pivotally engaged with the other one of the index members, another of said parts pivotally engaged with one of the fixed elements, some of said parts slidably engaged, and all of the parts connected for transmission of motion from one to another thereof so that, upon a movement of one of the parts, every one of the other parts is simultaneously, relatively moved.

7. In apparatus for use in solving mathematical problems, a frame; two members mounted for rectilinear movement with respect to the frame, the members being mounted so that the line of motion of one thereof is substantially in alinement with the line of motion of the other thereof; a linearly graduated scale along the line of motion of each of the members and fixed with respect to the frame and being for having the position of the member therealong represent a spacing; and means for transmitting motion from one to the other of said members for so controlling the movement of the members, that, for any position of the members, within predetermined limits, the position of one of the members represents a spacing that is equal to the square of the spacing represented by the position of the other of the members, said means being comprised of a plurality of relatively movable elements and a slidable connection between one of said elements and the frame; said members and said elements comprising a system of connected parts having some of the parts slidably connected and all of the parts connected for transmission of motion from one to another thereof and said parts being relatively constrained so that, upon a movement of one of the parts, every one of the other parts is simultaneously, relatively moved in a predetermined relationship with respect to the movement of each other one of the parts.

8. In apparatus for use in solving mathematical problems, a frame having two straight, linearly graduated, fixed scales substantially in alinement with each other, two sliding scale members parallel to the fixed scales, each of the sliding scales being mounted for movement longitudinally with respect to a respective one of the fixed scales, each of the sliding scales having a point thereon and being for being positioned so that the position of the aforementioned point thereof along the respective fixed scale represents a respective one of any pair of spacings of a series of pairs of spacings wherein one of the spacings of each pair is equal to the square of the other; and means for so controlling the movement of the sliding scales, that, for any position of the sliding scales, within predetermined limits, the position of the aforementioned point of one of the sliding scales along the respective fixed scale represents a spacing that is equal to the square of the spacing represented by the position of the aforementioned point of the other of the sliding scales along the respective fixed scale.

9. In apparatus for use in solving mathematical problems, six members jointed in such a way as to form two four-sided adjustable figures having one joint in common and having two of the members intersecting at said one joint and forming two adjacent sides of both of the figures, one of said adjacent sides of both of the figures being formed by each of said two members, said two members being adapted for maintaining the sides formed by each of said two members rigidly disposed at angles so that the sum of the angle between the sides formed by one of said two members and the angle between the sides formed by the other of said two members is equal to 180°; one of said figures having said adjacent sides thereof equal and having the other sides thereof equal, said other sides having a joint at the corner of the figure opposite the first mentioned joint; the other of said figures having said adjacent sides thereof equal and having the other sides thereof equal, the last named other sides having a joint at the corner of the last mentioned figure opposite the first mentioned joint; whereby, for any relative positioning of the aforementioned joints, within predetermined limits, the aforementioned joints define a right angle having the first mentioned joint at the apex of the right angle.

10. In apparatus for use in solving mathematical problems, six members jointed in such a way as to form two four-sided adjustable figures having one joint in common and having two of the members intersecting at said one joint and forming two adjacent sides of both of the figures, one of said adjacent sides of both of the figures being formed by each of said two members, the sides formed by one of said two members being disposed rigidly at right angles with respect to each other and the sides formed by the other of said two members being disposed rigidly at right angles with respect to each other; said figures having said adjacent sides thereof equal and having the other sides thereof equal; one of said figures having a joint at the corner thereof opposite the first mentioned joint; the other of said figures having a joint at the corner thereof opposite the first mentioned joint, whereby, for any relative positioning of the three joints hereinbefore specifically mentioned, within predetermined limits, the three joints define a right angle having the first mentioned joint at the apex of the right angle and the other two of the joints equidistant from the first mentioned joint.

11. In apparatus for use in solving mathematical problems, two adjustable right triangular figures including means for maintaining the figures similar, said figures having a side of one thereof constantly equal to the side opposite the corresponding side of the other thereof; an element on, and movable with respect to one extremity of, one of the sides opposite those that are constantly equal; a second element on, and movable with respect to one extremity of, the other of the sides opposite those that are constantly equal; and means for maintaining the distance from the other extremity of the first mentioned one of the last two mentioned sides and the first mentioned element equal to the square of the distance between the other extremity of the other of the two last mentioned sides and the aforenamed second element, for any position of the first mentioned element with respect to the last mentioned extremity of the first mentioned one of the two last mentioned sides, within predetermined limits.

12. In apparatus for use in solving algebraic equations of the form $$x^3+ax^2+bx+c=0$$

an adjustable right triangular figure, means for maintaining one side of said figure constantly equal to the square of the other side thereof, said sides being assigned to $x^2$ and $x$, respectively; a second adjustable right triangular figure; the side of the first mentioned figure that is assigned to $x^2$ being along and from one extremity of one side of the second figure, said side of the second figure being adapted for having the distance between the other extremity thereof and the nearest extremity of the last mentioned side of the first mentioned figure made to represent a value of $b$; a third adjustable right triangular figure; means for maintaining the second and third figures similar; the third triangular figure having the side thereof corresponding to the aforementioned side of the second figure constantly equal to the opposite side of the second figure, the sides of the second and third figures that are constantly equal being assigned to $\sqrt{ab-c}$; means for representing a dimension along and from one extremity of the other side of the third figure and for maintaining the last mentioned dimension equal to the length of the side of the first mentioned figure that is assigned to $x$; the last mentioned side of the third figure being adapted to be adjusted for making the distance between the other extremity thereof and the nearest extremity of the last mentioned dimension represent a value of the "$a$" term of the equation.

13. In apparatus for use in solving mathematical problems, an adjustable right triangular figure having sides adapted for having a dimension represented along and from one extremity of one side thereof and a dimension represented along and from one extremity of the other side thereof by having an element on said one side and movable with respect to the aforementioned extremity of said one side and an element on the other side and movable with respect to the aforementioned extremity of the last mentioned other side, and means for maintaining the distance between the other extremity of the first mentioned side and the first mentioned element equal to the square of the distance between the other extremity of the other side and the other element during movement of each element with respect to the first mentioned extremity of the side that it is on, for any position of the first mentioned element with respect to said other extremity of the first mentioned side, within predetermined limits.

14. In apparatus for use in solving algebraic equations of the form $$x^3+ax^2+bx+c=0$$

an indicating device including a mounting having a relatively fixed element and an indicating element mounted for movement with respect to said mounting, the position of which indicating element with respect to the fixed element represents a value of $x$ of the equation; three scale means being assigned to three quantities, $a$, $b$, and $\sqrt{ab-c}$, respectively, each of said scale means including a mounting having a relatively fixed element and a member mounted for movement with respect thereto, the position of which member with respect to the element of the mounting of the scale means represents a value of the one of the aforementioned quantities to which the scale means is assigned, each of said scale means having the member of each thereof adapted to be set at selected positions with respect to the fixed element of the mounting thereof; and means for determining the position of the indicating element with respect to the hereinbefore first mentioned fixed element for any values of the aforementioned quantities, within predetermined limits, for which the relative positions of the aforementioned members of the respective scale means are set with respect to the respective fixed elements of the respective scale means.

15. In apparatus for use in solving algebraic equations of the form $$x^3+ax^2+bx+c=0$$

an indicating device including a mounting having a relatively fixed element and an indicating element mounted for movement with respect to said mounting, the position of which indicating element with respect to the fixed element represents a value of $x$ of the equation; three scale means being assigned to three quantities, $a$, $b$, and $ab-c$, respectively, each of said scale means including a scale member having graduations thereon and an index member mounted for movement with respect to the scale member, the position of which index member with respect to the graduations on the scale member of the scale means represents a value of the one of aforementioned quantities to which the scale means is assigned, each of said scale means having the index member of each thereof adapted to be set at selected positions with respect to the graduations on the scale member thereof; and means for determining the position of the indicating element with respect to the fixed element for any values of the aforementioned quantities, within predetermined limits, for which the relative positions of the aforementioned index members of the respective scale means are set with respect to the respective scale members of the respective scale means.

16. In apparatus for use in solving algebraic equations of the form $$x^4+ax^2+bx+c=0$$

an indicating device including a mounting having a relatively fixed element and an indicating element mounted for movement with respect to said mounting, the position of which indicating element with respect to the fixed element represents a value of $x$ of the equation; three scale means being assigned to three quantities, $$\frac{1}{2}(a-1), \frac{1}{2}b, \text{ and } \sqrt{\frac{1}{4}b^2-c+\frac{1}{4}(a-1)^2}$$

respectively, each of said scale means including a mounting having a relatively fixed element and a member mounted for movement with respect thereto, the position of which member with respect to the element of the mounting of the scale means represents a value of the one of the aforementioned quantities to which the scale means is assigned, each of said scale means having the member of each thereof adapted to be set at selected positions with respect to the fixed element of the mounting thereof; and means for determining the position of the indicating element with respect to the hereinbefore first mentioned fixed element for any values of the aforementioned quantities, within predetermined limits, for which the relative positions of the aforementioned members of the respective scale means are set with respect to the respective fixed elements of the respective scale means.

17. In apparatus for use in solving algebraic equations of the form $$x^4+ax^2+bx+c=0$$

an indicating device including a mounting having a relatively fixed element and an indicating element mounted for movement with respect to said mounting, the position of which indicating element with respect to the fixed element represents a value of $x$ of the equation; three scale means being assigned to three quantities, $a$, $b$, and $$\tfrac{1}{4}b^2-c+\tfrac{1}{4}(a-1)^2$$

respectively, each of said scale means including a scale member having graduations thereon and an index member mounted for movement with respect to the scale member, the position of which index member with respect to the graduations on the scale member of the scale means represents a value of the one of the aforementioned quantities to which the scale means is assigned, each of said scale means having the index member of each thereof adapted to be set at selected positions with respect to the graduations on the scale member thereof; and means for determining the position of the indicating element with respect to the fixed element for any values of the aforementioned quantities, within predetermined limits, for which the relative positions of the aforementioned index members of the respective scale means are set with respect to the respective scale members of the respective scale means.

18. In apparatus for use in solving mathematical problems, a base having a rectilinear race and a rectilinear, graduated scale relatively fixed at right angles with respect to the race; a relatively movable member having two rectilinear guides relatively fixed at right angles with respect to each other; a connection between the member and the base, said connection being pivotal with respect to both the member and the base and slidable longitudinally with respect to the race and one of the guides; a second connection between the member and the base, said second connection being pivotal with respect to the base and being slidable with respect to the other of the guides and being in alinement with the race; a third connection between the member and the base, said third connection being substantially at the intersection of the guides and being pivotal with respect to both the member and the base and mounted for movement longitudinally with respect to the scale; and a second rectilinear, graduated scale having a pivotal connection with the member at the intersection of the guides and being mounted for movement along and longitudinally with respect to the first mentioned scale.

19. In apparatus for use in solving mathematical problems, a base having two rectilinear races, two scales each having connection with a respective one of the races, said connection being adapted for movement of each scale longitudinally of the respective race and for constraining the movement of each scale to a direction parallel to the respective race; a relatively movable member having two rectilinear guides relatively fixed at right angles with respect to each other; a connection between the member and one of the scales, said connection being slidable longitudinally with respect to one of the guides and being pivotal with respect to both the member and the scale and being thereby movable with the last mentioned scale longitudinally with respect to the respective race; a connection between the member and the base, said connection being pivotal with respect to the base and being slidable with respect to the other of the guides and being in alinement with the last mentioned race; and means for transmitting motion from the member to the other of the scales and for constraining the motion of the member with respect to the base and the last mentioned one of the scales so that the intersection of the guides is confined to rectilinear movement at right angles with respect to the last mentioned race and at a predetermined spacing with reference to the last mentioned connection and so that the spacing of a predetermined point on the last mentioned scale with reference to a point in alinement with the same scale and fixed with respect to the base is equal to the spacing of the point of intersection of the guides with reference to the last mentioned race measured in a direction perpendicular to the last mentioned race.

20. In apparatus for use in solving mathematical problems, a base having a rectilinear race and a graduated scale parallel to the race and fixed with respect to the race; scale means having relatively movable elements mounted for movement longitudinally of and parallel with respect to the race and the graduated scale; a relatively movable member having two rectilinear guides fixed at right angles with respect to each other; a connection between the member and one of the aforementioned elements of the scale means; said connection being slidable longitudinally with respect to one of the guides and being pivotal with respect to the member and said one of the elements and being thereby movable with the latter longitudinally with respect to the race and graduated scale; a connection between the member and the base, said connection being pivotal with respect to the base and being slidable with respect to the other of the guides and being in alinement with the race; a second graduated scale fixed with respect to the base; a second scale means having relatively movable elements including a scale member; the last mentioned elements being mounted for movement longitudinally of and parallel with respect to said second graduated scale; and means for transmitting motion from the first mentioned member to said scale member and for constraining the motion of the first mentioned member with respect to the base so that the intersection of the guides is confined to rectilinear movement at right angles with respect to the race and at a predetermined spacing with reference to the last mentioned connection and so that the spacing of a predetermined point on said scale member with reference to a point in alinement with the same scale member and fixed with respect to the base is equal to the spacing of the point of intersection of the guides with reference to the race measured in a direction perpendicular to the race.

21. In apparatus for use in solving mathematical problems, a base having a rectilinear race; a relatively movable member having two rectilinear guides fixed at right angles with respect to each other; a pivotal connection between one of the guides and the race, said connection being slidable longitudinally with respect to both the race and the guide; a pivotal connection between the other guide and the base at a point in alinement with the race, the last mentioned pivotal connection being slidable longitudinally with respect to said other guide; a rectilinear scale member mounted for lengthwise translation on the base; and means for transmitting motion from the first mentioned member to said scale member and for constraining the motion of the first mentioned member with respect to the base so that the intersection of the guides is confined to rectilinear movement at right angles with respect to the race and at a predetermined spacing with reference to the last mentioned connection and so that the spacing of a predetermined point on said scale member with reference to a point in alinement with the same scale member and fixed with respect to the base is equal to the spacing of the point of intersection of the guides with reference to the race measured in a direction perpendicular to the race.

22. In apparatus for use in solving mathematical problems, a base having two rectilinear races fixed with respect to the base, two long and straight scale members each having a connection with a respective one of the races, each said connection being adapted for movement of the member along the respective race and for maintaining the member lengthwise with respect to the race and for constraining the movement of the member to a direction parallel to the race, and means for transmitting motion from one to the other of said members for controlling the position of one of the members along the respective one of the races with respect to the position of the other one of the members along the other one of the races so that, for any relative positioning of the members along the races, within predetermined limits, the spacing of a predetermined point on one of the members with reference to a point in alinement with the same member and fixed with respect to the base is equal to the square of the spacing of a predetermined point on the other of the members with reference to a point in alinement with the last mentioned member and fixed with respect to the base, said means including a pivotal connection with one of the members and a pivotal connection with the other of the members, and said means being comprised of a system of connected elements having pivotal connections between some of the elements and slidable connections between other of the elements, and said system of elements having, as a part thereof, straight arms and a pivotal and slidable connection between one of the arms and the base.

NEAL GARRETT.